United States Patent
Patil

(10) Patent No.: US 8,121,047 B2
(45) Date of Patent: Feb. 21, 2012

(54) ACCESS TECHNOLOGY INDICATION FOR PROXY MOBILE INTERNET PROTOCOL VERSION 6

(75) Inventor: Basavaraj Patil, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 260 days.

(21) Appl. No.: 12/285,407

(22) Filed: Oct. 3, 2008

(65) Prior Publication Data

US 2009/0094693 A1 Apr. 9, 2009

Related U.S. Application Data

(60) Provisional application No. 60/960,588, filed on Oct. 4, 2007.

(51) Int. Cl.
*H04J 1/16* (2006.01)
*H04L 12/56* (2006.01)

(52) U.S. Cl. ......... 370/252; 370/254; 370/289; 370/331

(58) Field of Classification Search .................. 370/401, 370/328, 252, 254, 289, 329, 331; 726/12; 713/171
See application file for complete search history.

(56) References Cited

U.S. PATENT DOCUMENTS

| | | | |
|---|---|---|---|
| 2004/0141477 A1 | 7/2004 | Xu et al. | |
| 2005/0136920 A1* | 6/2005 | Rink et al. | 455/433 |
| 2005/0271015 A1* | 12/2005 | Nishida et al. | 370/331 |
| 2006/0133311 A1* | 6/2006 | Drevon et al. | 370/328 |
| 2006/0291422 A1* | 12/2006 | Rochford | 370/331 |
| 2007/0268919 A1* | 11/2007 | Sarikaya et al. | 370/401 |
| 2008/0162936 A1* | 7/2008 | Haddad | 713/171 |
| 2009/0034494 A1* | 2/2009 | Binet et al. | 370/338 |
| 2009/0073935 A1* | 3/2009 | Xia et al. | 370/331 |

FOREIGN PATENT DOCUMENTS

EP 1 280 318 A2 1/2003

(Continued)

OTHER PUBLICATIONS

IEEE Std 802.11a-1999 (R2003), Supplement to IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications, High-speed Physcial Layer in the 5 GHz Band, IEEE-SA Standards Board, Jun. 12, 2003, pp. i-viii, 1-83.

(Continued)

*Primary Examiner* — John Pezzlo
(74) *Attorney, Agent, or Firm* — Squire Sanders (US) LLP

(57) ABSTRACT

A Local Mobility Anchor/Agent (LMA), on seeing a Proxy Binding Update (PBU) with a same Network Access Identifier (NAI) but with a different access technology indication or interface identifier can assign a unique prefix to a mobile node (MN) via a PBAck message. The unique prefix avoids the creation of a duplicate address that would conflict with the address assigned to another interface that was configured using a prefix provided by the LMA. This solution can enable an MN to attach to different Mobility Access Gateways (MAGs) that are in different access networks of differing technologies but attached to the same LMA (i.e. the MAGs and the LMA are in the same PMIP6 domain) and not cause conflicts in prefix assignment or confuse the LMA into thinking that the MN had performed a handover (HO).

16 Claims, 6 Drawing Sheets

FOREIGN PATENT DOCUMENTS

WO    WO 2007/052904 A1    5/2007

OTHER PUBLICATIONS

IEEE Std 802.11b-1999 (R2003); Supplement to IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications: Higher-Speed Physical Layer Extension in the 2.4 GHz Band, IEEE-SA Standards Board, Jun. 12, 2003, Cover Page, pp. i-vii, 1-89.

IEEE Std 802.11g-2003, EEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; Amendment 4: Further Higher Data Rate Extension in the 2.4 GHz Band, IEEE Computer Society, Jun. 27, 2003, pp. i-x, 1-67.

IEEE Std 802.11g-2003, IEEE Std 802.16e-2005, and IEEE Std 802.16/2004/Cor1-2005; IEEE Standard for Local and Metropolitan Area Networks, Part 16: Air Interface for Fixed and Moble Broadband Wireless Access Systems, Amendment 2: Physical and Medium Access Control Layers for Combined Fixed and Mobile Operation in Licensed Bands, and Corrigendum 1; IEEE Computer Society and the IEEE Microwave Theory and Techniques Society, Feb. 28, 2006, Cover Sheet and Preliminary Material: 10 pgs., Table of Contents: 27 pgs., pp. 1-822: pp. 4, 6, 12, 652, 660, 772, 774, 776, 778, 794, and 818 are blank in the original (See especially pp. 626-630).

PCT International Search Report and Written Opinion, International Application No. PCT/EP2008/063071, Date of Completion: Mar. 12, 2009, Date of Mailing: Mar. 19, 2009, pp. 1-8.

* cited by examiner

ACCESS TECHNOLOGY INDICATION FOR PROXY MOBILE INTERNET PROTOCOL VERSION 6

CROSS REFERENCE TO RELATED APPLICATIONS

This application claims priority under 35 U.S.C. §119(e) of U.S. Provisional Patent Application Ser. No. 60/960,588, filed on Oct. 4, 2007. The subject matter of the earlier filed application is hereby incorporated by reference.

BACKGROUND OF THE INVENTION

1. Field of the Invention

This invention is related to the area of IP Mobility. The Internet Engineering Task Force (IETF) is in the process of defining a network based mobility protocol called as Proxy Mobile Internet Protocol (IP) version 6 (PMIP6) in the Netlmm working group. Certain embodiments of the present invention are applicable in the context of the PMIP6 protocol. PMIP6 is being adopted for use in Third Generation Partnership Protocol (3GPP) and 3GPP2 architectures in addition to WiMAX.

2. Description of the Related Art

When a mobile node (MN) has multiple interfaces (for example, Institute for Electrical and Electronics Engineers (IEEE) 802.11a/b/g or generally referred to as Wireless Fidelity (WiFi), Global System for Mobile Communications (GSM), Enhanced Data rates for Global Evolution (EDGE), Wideband Code Division Multiple Access (WCDMA), High-Speed Packet Access (HSPA), IEEE 802.16e, General Packet Radio Services (GPRS), Third Generation (3G), or the like) it is possible for the MN to attach, via these interfaces, to the appropriate access networks simultaneously. Hence a 3G MN may be connected to the Universal Mobile Telecommunications System (UMTS) packet core as well as being connected to the WiFi/802.11 network at the same time. If both these access networks supported Proxy MIP6 functionality, the MN would be attached to the Mobility Access Gateways (MAG) in these networks. When an MN attaches to a MAG, the MAG sends a Proxy Binding Update (PBU) to the Local Mobility Agent/Anchor (LMA). The identifier used in the PBU can be a common identifier across the 3G and WiFi networks. An example of such an identifier is a Network Access Identifier (NAI).

If these MAGs are served by the same Local Mobility Agent (LMA), there is no conventional way for the LMA to recognize that the Proxy Binding Updates (PBUs) being received from different MAGs are for the same MN (Identified by a common NAI across the interfaces). Thus, when the LMA receives the PBU from multiple MAGs for the same MN, the LMA conventionally would only process the last received PBU, because such is the normal behavior of the LMA. The conventional LMA cannot differentiate that the PBU is from the same MN but is sent by MAGs as a result of the MN attaching to different access networks via different interfaces from a scenario in which the connection has changed attachments. Consequently, a conventional LMA would normally delete the previous MAG entry in the Binding cache and insert the address of the MAG from the PBU that it last received.

SUMMARY OF THE INVENTION

A method can include preparing an access individuated indicator. The method can also include sending a binding message to a local mobility entity including the access individuated indicator.

Another method can include attaching to a first interface and attaching to a second interface in parallel. The method can further include receiving a prefix corresponding to at least one of the first or second interfaces, generating a corresponding new address for a mobile node based on the prefix, and associating the new address with the corresponding interface.

A further method can include receiving a binding message including an access individuated indicator. The method can also include processing the message to permit a parallel connection, wherein the parallel connection is parallel to an existing connection.

Each of the respective methods identified above can be implemented by the use of a computer program embodied on a computer-readable medium, encoding instructions for performing the respective method on a device.

An apparatus can include preparing means for preparing an access individuated indicator. The apparatus can also include sending means for sending a binding message to a local mobility entity including the access individuated indicator.

Another apparatus can include attaching means for attaching to a first interface and attaching to a second interface in parallel. The apparatus can further include receiving means for receiving a prefix corresponding to at least one of the first or second interfaces. The apparatus can additionally include processing means for generating a corresponding new address for a mobile node based on the prefix and associating the new address with the corresponding interface.

A further apparatus can include receiving means for receiving a binding message including an access individuated indicator. The apparatus also includes processing means for processing the message to permit a parallel connection, wherein the parallel connection is parallel to an existing connection.

An apparatus can include a preparing unit configured to prepare an access individuated indicator. The apparatus can also include a sending unit configured to send a binding message to a local mobility entity including the access individuated indicator.

Another apparatus can include an attaching unit configured to attach to a first interface and to attach to a second interface in parallel. The apparatus can further include a receiving unit configured to receive a prefix corresponding to at least one of the first or second interfaces. The apparatus can additionally include a processing unit configured to generate a corresponding new address for a mobile node based on the prefix and to associate the new address with the corresponding interface.

A further apparatus can include a receiving unit configured to receive a binding message including an access individuated indicator. The apparatus can also include processing unit configured to process the message to permit a parallel connection, wherein the parallel connection is parallel to an existing connection.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

The conventional treatment of PBUs from multiple MAGs may prevent appropriate connectivity. Thus, certain embodiments of the present invention advantageously overcome such a barrier to connectivity.

There are at least two ways such a barrier to proper connectivity may be overcome. A first way is by indicating the access network technology type in the PBU by the MAG to the LMA. A second way is by indicating the Interface Identification (ID) of the MN to the LMA in the PBU if it is available to the MAG.

When the MN attaches to the MAG and completes access authentication, the MAG will send a PBU (Proxy Binding Update) to the LMA, which contains the MN-ID. Two new options can be added to the PBU as a solution for dealing with multi-interface hosts that attach to MAGs in access networks that are served by the same LMA.

The options to be included in the Proxy Binding Update message are access network type and/or MN interface Identification (ID). Access network type can indicate whether the access network by which the MN is attached to the MAG is of a certain technology type. Examples of access network type include: GPRS, UMTS, High Speed Packet Access (HSPA), Long Term Evolution (LTE), Evolution Data Optimized (EV-DO), Code Division Multiple Access (CDMA) version 1X (CDMA1X), Worldwide Interoperability for Microwave Access (WiMAX), Institute for Electrical and Electronics Engineers (IEEE) 802.11a/b/g, and the like.

If the MN is able to provide its interface ID to the MAG during the attach process or the MAG obtains it from an access, authorization, and accounting (AAA) function or some other entity during access authentication, the MAG can include the Interface ID in the Proxy Binding Update. A new parameter proposed herein for carrying the Interface ID is an "MN-Interface-ID."

The LMA that receives the information about either the access technology type or the interface ID from a MAG, is able to process it and determine that the PBU sent by the MAG is for an MN that may already have a binding cache entry on another interface, i.e. is for an MN that is attaching via a different interface to the network. The LMA can then assign a different prefix to the MN and respond via the PBAck message.

Figure 1:
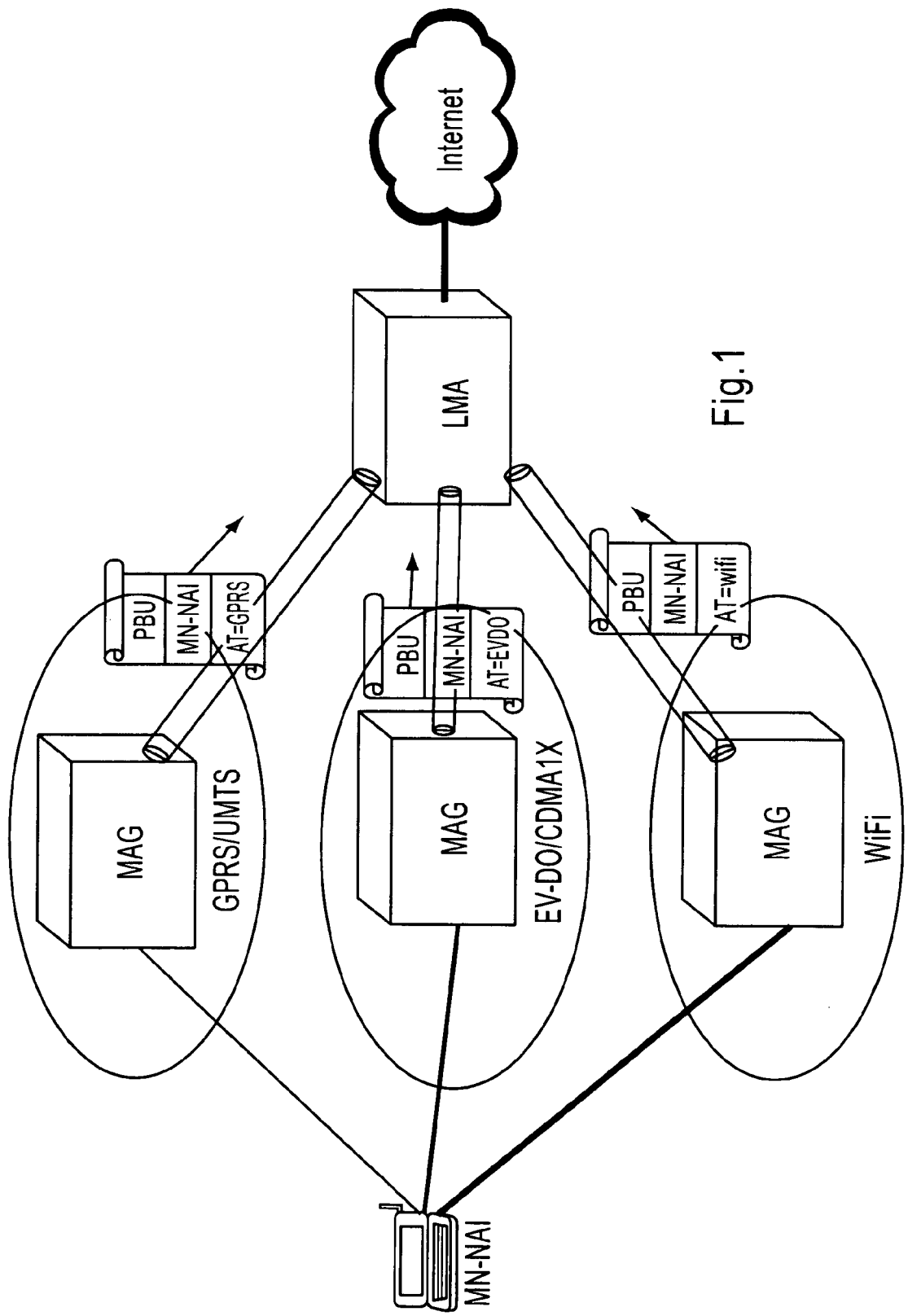
FIG. 1 illustrates a scenario according to an embodiment of the present invention.

FIG. 1 illustrates a system in which a MN is attached to multiple access networks at the same time via its interfaces. As shown in FIG. 1, an LMA may need to differentiate the fact that the PBUs are from the same MN but from different access networks. The LMA may accomplish this objective by looking at the Access Technology (AT) field or the Interface ID (IID) field in the PBU message.

Such an example scenario is further illustrated by FIG. 2, as discussed below.

Figure 2:
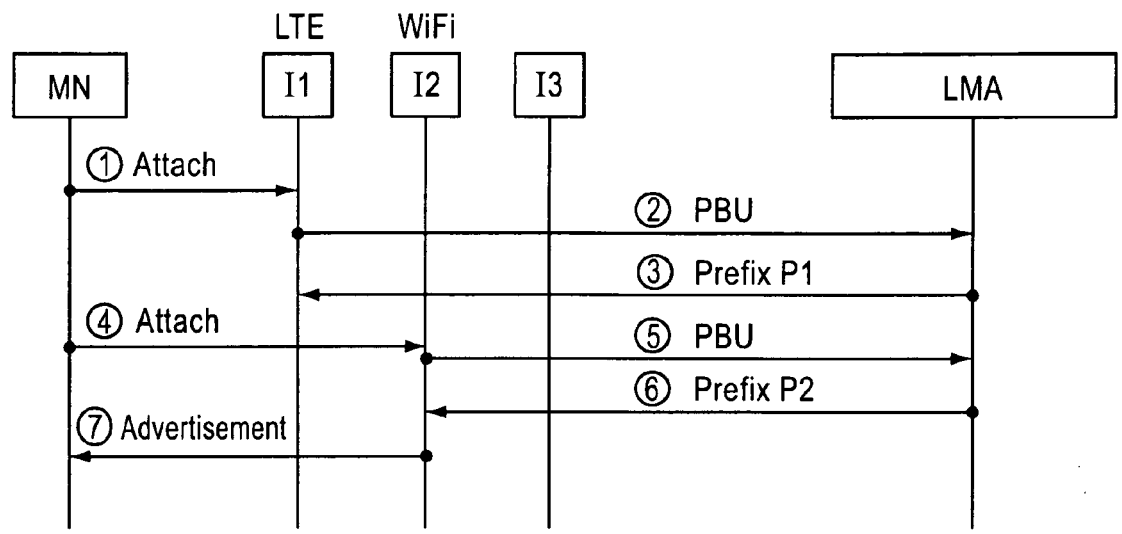
FIG. 2 illustrates a signal flow according to an embodiment of the present invention.

As shown in FIG. 2, at step (1), an MN, which has interfaces I1, I2 and I3, attaches via Interface I1 to an LTE network. Next, at step 2, MAG1 in the LTE network sends a PBU to the assigned LMA on behalf of the MN. The MN-ID field in the PBU, in this example, is set to: MN@operatorX.com (for example). The Access Network Type field in the PBU in this example is set to =LTE (because, in this example, an LTE access network is the network of MAG1, to which the MN has attached). The MAG1 inserts an Interface ID if it is aware of the MNs Interface ID (IID), and otherwise it leaves the MN-Interface-ID field empty (or set to 0). Next, at step (3), when the LMA has received the PBU from MAG1, the LMA assigns a prefix, P1, to the MN and sends the prefix via PBAck to MAG1.

Subsequently, at step (4), the MN attaches via a WiFi interface, I2, to an 802.11g network that has PMIP6 capability. Then, at step (5), MAG2 in the 802.11g network that the MN is attached to sends a PBU to the LMA on behalf of the MN. The MN-ID field in the PBU is, in this example, set to: MN@operatorX.com (example). The Access Network Type field in the PBU in this example is set to: 802.11g. MAG2 inserts an Interface ID if it is aware of the MNs IID, and otherwise it leaves the MN-Interface-ID field empty (or set to 0).

Next, at step (6), the LMA that receives the PBU from MAG2 processes it and notes that the MN-ID field is the same for which it already has assigned a prefix, and that the MN-ID field exists in the binding cache. However the LMA can recognize that the access network type from which the PBU was sent is different by parsing the Access Network type field. It can also realize that the Interface by which the MN is attaching to the network is different if the Interface ID field was available in both PBUs received from MAG1 and MAG2. The LMA can then choose a different prefix, P2, and assign it to the MN, sending prefix P2 to MAG2 in the PBAck.

The prefix in step (6) can be Prefix P1 if the LMA is aware that the MN is capable of handling the same prefix or if the LMA is aware of the MN having a virtual interface for the interfaces that are being used by the MN to connect to the two networks. The LMA can also have a policy that would allow the LMA to recognize the capability of an MN attaching to the LMA via MAG2 and assign Prefix P1 itself in the PBAck.

Finally, at step (7), the MN can receive prefix P2 via a router advertisement from MAG2 on Interface I2. The MN can create an address from Prefix P2 (using stateless address autoconfiguration) and can associate that address to interface I2.

In the above described scenario, the LMA can be aware of which prefix to assign to an MN because of the awareness that the PBU for the MN (with a common ID) is coming from a different interface/access network. Accordingly, the solution may be relatively uncomplicated to implement, as it may be implemented, for example, by extending the PBU with two new parameters, and employing appropriate processing in the MN, MAGs, and LMA. Certain advantages of the described embodiments include that they can help to solve the issues associated with MNs that have multiple interfaces and can attach simultaneously via these interfaces.

If an MN with a common Identifier (NAI) attaches to MAGs in different access networks via different interfaces, the LMA needs to be able to differentiate the fact that the PBUs are from the same MN but from different interfaces.

More specifically, the LMA, on seeing the PBU with the same NAI but with a different access technology indication or interface identifier could assign a unique prefix via the PBAck, where the unique prefix does not conflict with the prefix assigned to another interface. This solution would enable an MN to attach to different MAGs that are in different access networks of differing technologies and not cause conflicts in prefix assignment or confuse the LMA into thinking that the MN had performed a handover (HO).

This solution may be useful, for example, for interworking between LTE and High Rate Packet Data (HRPD)/Evolution Data Optimized (EV-DO) or between WiMAX and HRPD, or in other similar situations. Thus, an MN can be connected to multiple networks at the same time and hence the ability to differentiate the access technology to which it is attached may be valuable.

Figure 3:
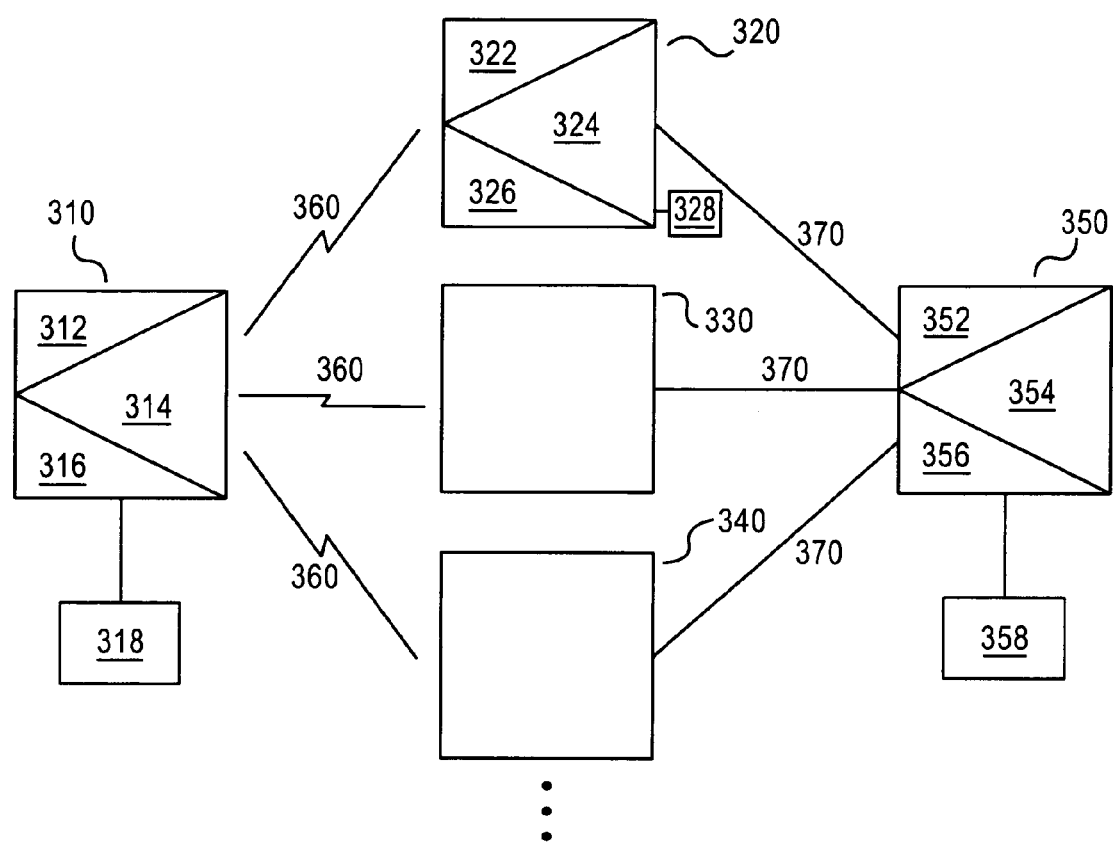
FIG. 3 illustrates a system according to an embodiment of the present invention.

FIG. 3 illustrates a system according to an embodiment of the present invention. The system, as shown in FIG. 3, can include a mobile node (MN) 310, a plurality of mobility access gateways (MAGs) 320, 330, and 340 (additional MAGs may be included, but are not illustrated, for simplicity), and a local mobility anchor or agent (LMA) 350.

The LMA 350 can include a receiving unit 352 configured to receive data from external devices, a processing unit 354 configured to process received data and prepare data to be sent, and a sending unit 356 configured to send data to external devices. Each of the units 352, 354, and 356 can be, for example, implemented using software running on computer hardware such as a general purpose computer or an application specific integrated circuit. The LMA 350 can also include a memory 358 for storing data. The memory 358 can be either internal or external to LMA 350. Examples of memories include hard drives, flash Random Access Memory (RAM), and Compact Disc Read Only Memory (CD-ROM).

A first MAG 320 can be configured to function as an interface. The MAG 320 can include a preparing unit 324 configured to prepare an access individuated indicator, such as an access technology indication or an interface identifier. The MAG 320 can include a sending unit 326 configured to send data to external devices and a receiving unit 322 configured to receive data from external devices. Each of the units 322, 324, and 326 can be, for example, implemented using software running on computer hardware such as a general purpose computer or an application specific integrated circuit. Optionally, the MAG 320 can include a memory 328 for storing data. Examples of memories include hard drives, flash Random Access Memory (RAM), and Compact Disc Read Only Memory (CD-ROM).

The details of MAGS 330 and 340 are not shown, but can be similar to MAG 320. There is no need, however, for MAGS 330 and 340 to be the same as MAG 320, and consequently MAGS 330 and 340 can vary considerably from MAG 320, each of MAGS 320, 330, and 340 serving to operate in accordance with, for example, a different communication standard from one another.

The MN 310 can including an attaching unit 316 configured to attach to a plurality of interfaces, and to send data to external devices. The MN 310 can also include a processing unit 314 configured to prepare attachment and data to be sent, as well as data received or stored in memory. The MN 310 can further include a receiving unit 312 configured to receive data from external devices. Each of the units 312, 314, and 316 can be, for example, implemented using software running on computer hardware such as a general purpose computer or an application specific integrated circuit. Optionally, the MN 310 can include a memory 318 for storing data. Examples of memories include hard drives, flash Random Access Memory (RAM), and Compact Disc Read Only Memory (CD-ROM).

The MN 310 can communicate with one or more of the MAGs 320, 330, and 340 using a communication link 360, which may, for example, be a wireless communication link. Each of the MAGs 320, 330, and 340 can be configured to communicate both over the communication link 360, but also a second communication link 370, which may, for example, be a wired communication link, such as a coaxial cable connection or a fiber optic connection.

Figure 4:
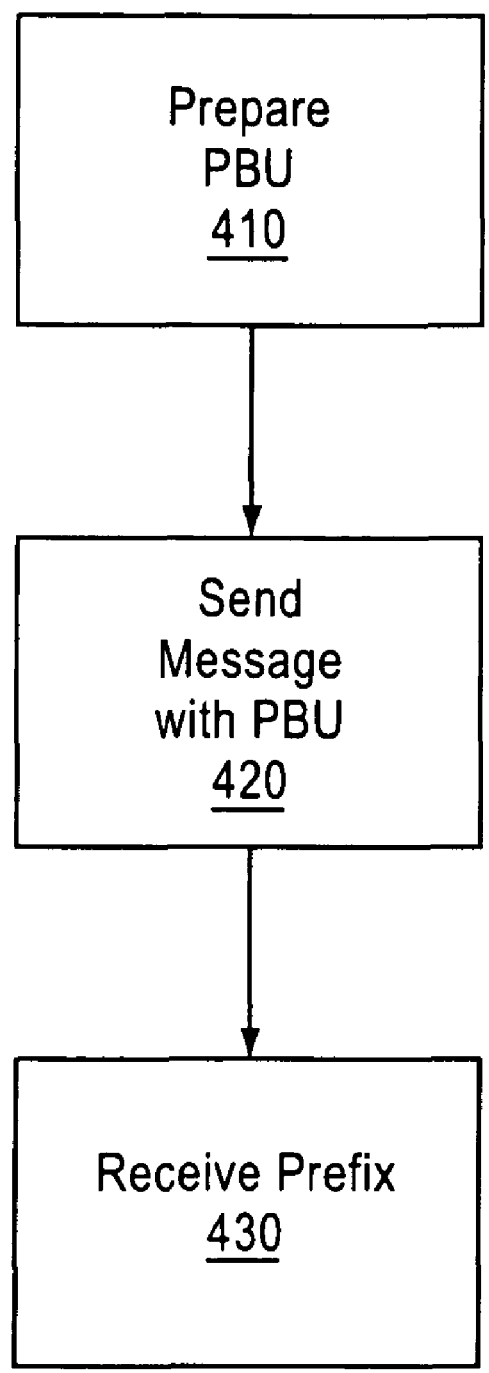
FIG. 4 illustrates a method according to an embodiment of the present invention.

FIG. 4 illustrates a method according to an embodiment of the present invention. As shown in FIG. 4, a method can include preparing 410 an access individuated indicator, wherein the access individuated indicator can include an access technology indication or an interface identifier. The access individuated indicator can assist the LMA in identifying an individual access technology from among a plurality of possible access technologies or a particular access interface from among a plurality of access interfaces.

The method can also include sending 420 a binding message to a local mobility entity including the access individuated indicator. The interface identifier can be obtained from a mobile node during attachment or from an access, authorization, and accounting function during authentication. The binding message can be sent from a mobility access gateway. The local mobility entity can be a local mobility anchor or agent.

The method shown in FIG. 4 can optionally further include receiving 430 a prefix for a mobile node, wherein the prefix was generated in response to the binding message.

Figure 5:
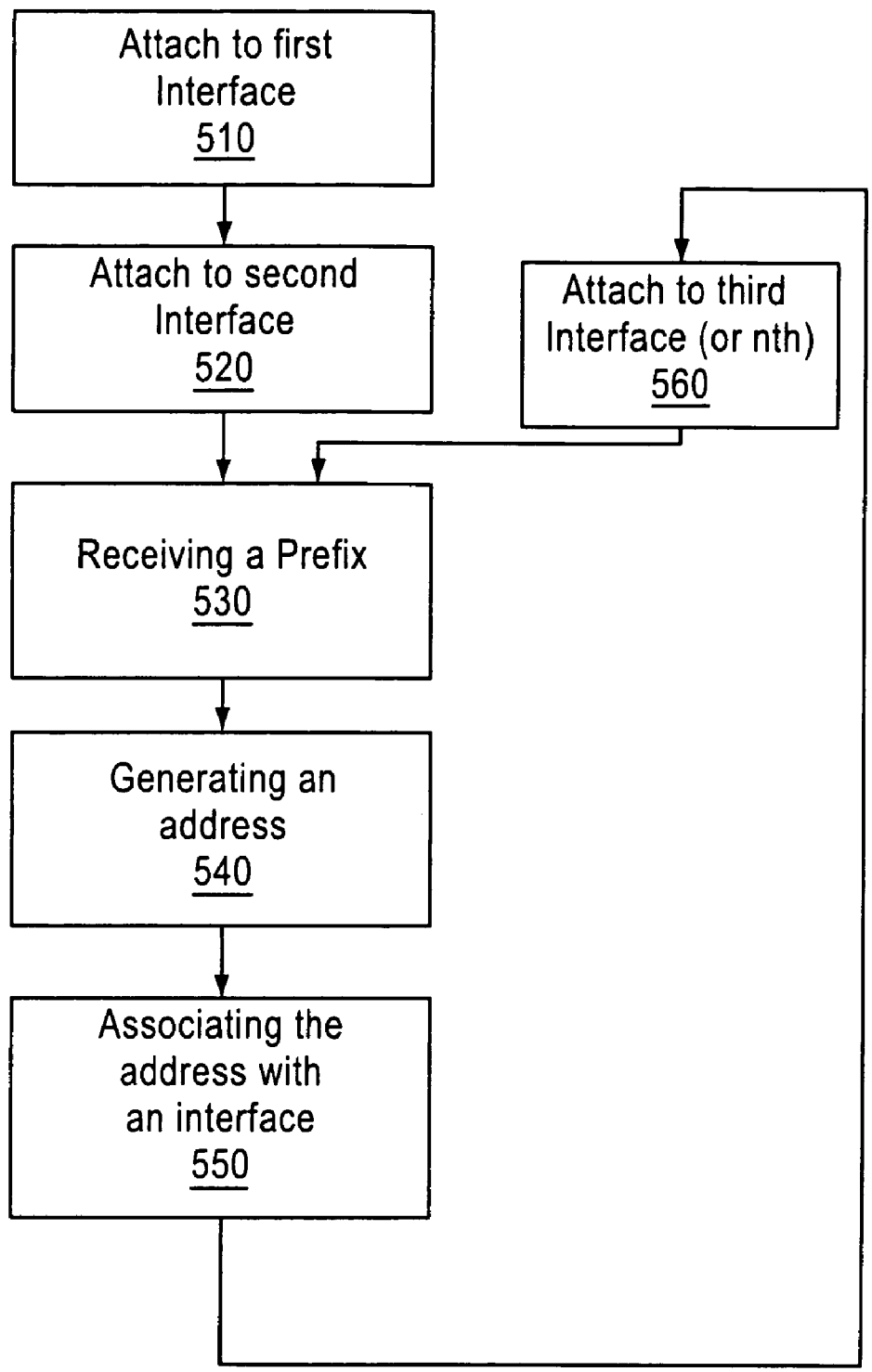
FIG. 5 illustrates another method according to an embodiment of the present invention.

FIG. 5 illustrates another method according to an embodiment of the present invention. As shown in FIG. 5, the method can include attaching 510 to a first interface and attaching 520 to a second interface in parallel. The method can further include receiving 530 a prefix corresponding to at least one of the first or second interfaces, generating 540 a corresponding new address for a mobile node based on the prefix, and associating 550 the new address with the corresponding interface.

The method can further include attaching 560 to a third interface, and then receiving a second prefix corresponding to the third interface (as in 530 above), generating a second new address for a mobile node based on the second prefix (as in 540 above), and associating the second new address with the third interface (as in 550). This method can be repeated an indefinite number of times.

Figure 6:
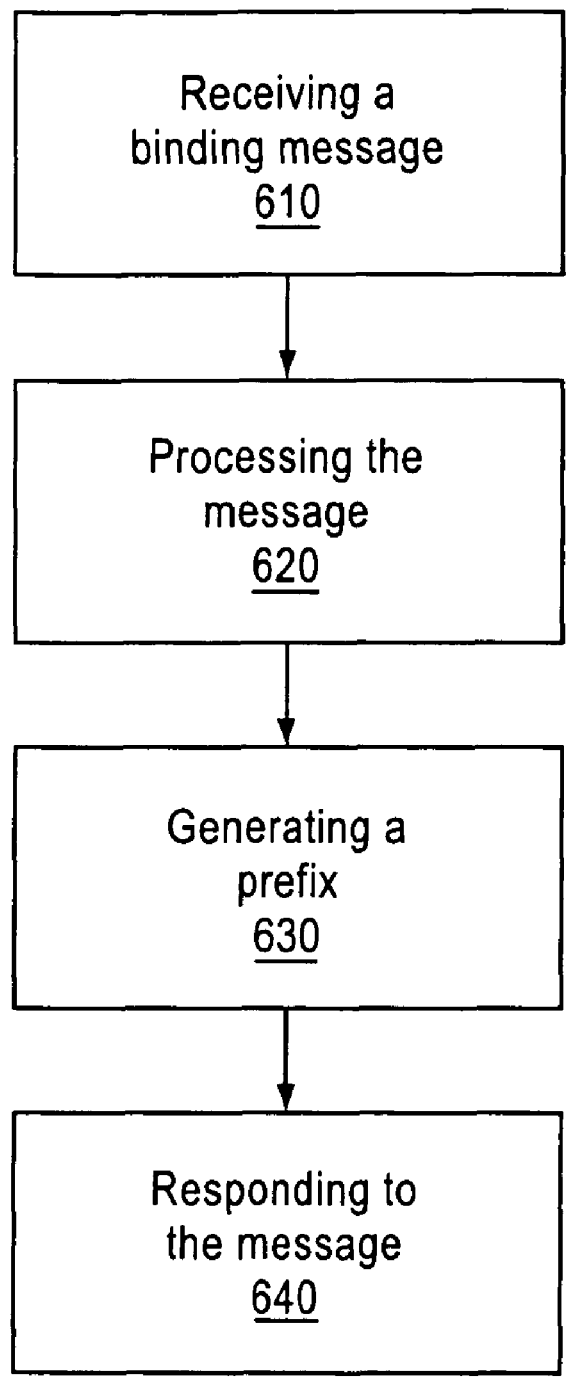
FIG. 6 illustrates a further method according to an embodiment of the present invention.

FIG. 6 illustrates a further method according to an embodiment of the present invention. As shown in FIG. 6, the method can include receiving 610 a binding message including an access individuated indicator. The method can also include processing 620 the message to permit a parallel connection, wherein the parallel connection is parallel to an existing connection.

The method can further including generating 630 a prefix corresponding to an interface associated with the access individuated indicator. The method can additionally include responding 640 to the message with a binding acknowledgement message that includes the prefix.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention, which is defined by the attached claims.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method comprising:
preparing at a mobility access gateway an access technology indication;
sending from the mobility access gateway a binding message to a local mobility entity including the access technology indication; and
receiving a prefix corresponding to an interface to which a mobile node is attached, wherein the prefix was generated in response to the binding message.

2. The method of claim 1, wherein the local mobility entity is a local mobility anchor or agent.

3. A method, comprising:
attaching to a first interface and attaching to a second interface in parallel;
receiving from a mobility access gateway a prefix corresponding to at least one of the first or second interfaces;
generating a corresponding new address for a mobile node based on the prefix received from the mobility access gateway and associating the new address with the corresponding interface;
attaching to a third interface;
receiving from a mobility access gateway a second prefix corresponding to the third interface; and
generating a second new address for a mobile node based on the second prefix received from the mobility access gateway; and associating the second new address with the third interface.

4. The method of claim 3, further comprising:
receiving a binding message including an access technology indication.

5. The method of claim 4, further comprising:
processing the message to permit a parallel connection, wherein the parallel connection is parallel to an existing connection.

6. The method of claim 4, further comprising:
generating a prefix corresponding to an interface associated with the access technology indication.

7. The method of claim 4, further comprising:
responding to the message with a binding acknowledgement message that includes the prefix.

8. An apparatus, comprising:
a preparing unit configured to prepare an access technology indication;
a sending unit configured to send a binding message to a local mobility entity including the access technology indication; and
a receiving unit configured to receive a prefix corresponding to an interface to which a mobile node is attached, wherein the prefix was generated in response to the binding message.

9. An apparatus, comprising:
an attaching unit configured to attach to a first interface and to attach to a second interface in parallel;
a receiving unit configured to receive from a mobility access gateway a prefix corresponding to at least one of the first or second interfaces; and
a processing unit configured to generate a corresponding new address for a mobile node based on the prefix received from the mobility access gateway and to associate the new address with the corresponding interface,
wherein the attaching unit is further configured to attach to a third interface, the receiving unit is further configured to receive from the mobility access gateway a second prefix corresponding to the third interface, and the processing unit is further configured to generate a second new address for a mobile node based on the second prefix received from the mobility access gateway and associate the second new address with the third interface.

10. An apparatus, comprising:
a receiving unit configured to receive a binding message including an access technology indication;
a processing unit configured to process the message to permit a parallel connection for a mobile node, wherein the parallel connection is parallel to an existing connection, wherein the processing unit is configured to assign a prefix corresponding to an interface associated with the access technology indication.

11. The apparatus of claim 10, further comprising:
a sending unit configured to respond to the message with a binding acknowledgement message that includes the prefix.

12. An apparatus, comprising:
preparing means for preparing an access technology indication;
sending means for sending a binding message to a local mobility entity including the access technology indication; and
receiving means configured to receive a prefix corresponding to an interface to which a mobile node is attached, wherein the prefix was generated in response to the binding message.

13. An apparatus, comprising:
attaching means for attaching to a first interface and attaching to a second interface in parallel;
receiving means for receiving from a mobility access gateway a prefix corresponding to at least one of the first or second interfaces; and
processing means for generating a corresponding new address for a mobile node based on the prefix received from the mobility access gateway and associating the new address with the corresponding interface,
wherein the attaching means is further configured to attach to a third interface, the receiving means is further configured to receive from the mobility access gateway a second prefix corresponding to the third interface, and the processing means is further configured to generate a second new address for a mobile node based on the second prefix received from the mobility access gateway and associate the second new address with the third interface.

14. An apparatus, comprising:
receiving means for receiving a binding message including an access technology indication; and
processing means for processing the message to permit a parallel connection for a mobile node, wherein the parallel connection is parallel to an existing connection, wherein the processing means is configured to assign a prefix corresponding to an interface associated with the access technology indication.

15. The apparatus of claim 14, further comprising:
sending means for responding to the message with a binding acknowledgement message that includes the prefix.

16. A computer program embodied on a non-transitory computer-readable medium, encoding instructions for performing a method when executed on a device, the method comprising:
preparing an access technology indication;
sending a binding message to a local mobility entity including the access technology indication; and
receiving a prefix corresponding to an interface to which a mobile node is attached, wherein the prefix was generated in response to the binding message.

* * * * *